United States Patent
Homer et al.

(10) Patent No.: US 7,708,240 B2
(45) Date of Patent: May 4, 2010

(54) COMPUTER DOCKING SYSTEM

(75) Inventors: Steven S. Homer, Tomball, TX (US); Paul J. Doczy, Cypress, TX (US); Mark Solomon, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 127 days.

(21) Appl. No.: 10/901,769

(22) Filed: Jul. 29, 2004

(65) Prior Publication Data

US 2006/0022097 A1    Feb. 2, 2006

(51) Int. Cl.
*A47F 5/02*    (2006.01)
(52) U.S. Cl. .................. 248/130; 248/919; 248/920
(58) Field of Classification Search .......... 248/919, 248/450, 920, 921, 922, 923, 917, 176.1, 248/447, 133, 136, 139, 144, 150, 918, 458, 248/130, 291.1, 284.1; 403/252, 255, 61, 403/331; 40/606.15, 606.14, 748, 750, 754; 361/FOR. 104
See application file for complete search history.

(56) References Cited

U.S. PATENT DOCUMENTS

| D327,502 | S | * | 6/1992 | Maloney | D19/88 |
|---|---|---|---|---|---|
| 5,408,382 | A | | 4/1995 | Schultz et al. | |
| 5,436,792 | A | | 7/1995 | Leman et al. | |
| 5,544,010 | A | | 8/1996 | Schultz et al. | |
| 5,629,833 | A | * | 5/1997 | Ido et al. | 361/681 |
| 5,633,782 | A | | 5/1997 | Goodman et al. | |
| 5,687,939 | A | * | 11/1997 | Moscovitch | 248/122.1 |
| 5,729,429 | A | | 3/1998 | Margaritis et al. | |
| 5,751,548 | A | | 5/1998 | Hall et al. | |
| 5,769,369 | A | * | 6/1998 | Meinel | 248/176.1 |
| 6,189,842 | B1 | * | 2/2001 | Bergeron Gull et al. | 248/125.1 |
| 6,490,154 | B2 | | 12/2002 | Thompson | |
| 6,522,529 | B1 | * | 2/2003 | Huilgol et al. | 361/681 |
| 6,543,168 | B1 | * | 4/2003 | Moore | 40/747 |
| 6,554,238 | B1 | * | 4/2003 | Hibberd | 248/278.1 |
| 6,585,201 | B1 | * | 7/2003 | Reed | 248/181.1 |
| 6,608,749 | B2 | | 8/2003 | Hubbard | |
| 6,644,611 | B1 | * | 11/2003 | Tai | 248/292.13 |
| 6,742,221 | B2 | * | 6/2004 | Lu et al. | 16/367 |
| 6,856,506 | B2 | * | 2/2005 | Doherty et al. | 361/683 |
| 6,874,743 | B2 | * | 4/2005 | Watanabe et al. | 248/276.1 |
| 6,915,995 | B2 | * | 7/2005 | Gillespie | 248/278.1 |
| 2003/0222848 | A1 | | 12/2003 | Solomon et al. | |
| 2003/0235029 | A1 | | 12/2003 | Doherty et al. | |
| 2006/0007644 | A1 | * | 1/2006 | Huilgol et al. | 361/681 |
| 2006/0022096 | A1 | * | 2/2006 | Chan et al. | 248/129 |

* cited by examiner

*Primary Examiner*—A. Joseph Wujciak, III

(57) ABSTRACT

A computer docking system comprises a support base and a docking bracket having a plurality of holding members. Each holding member is adapted to receive and support a computer display device. Each holding member is also adapted to interchangeably engage the support base to enable positioning of the computer display device in at least two different viewing orientations.

19 Claims, 5 Drawing Sheets

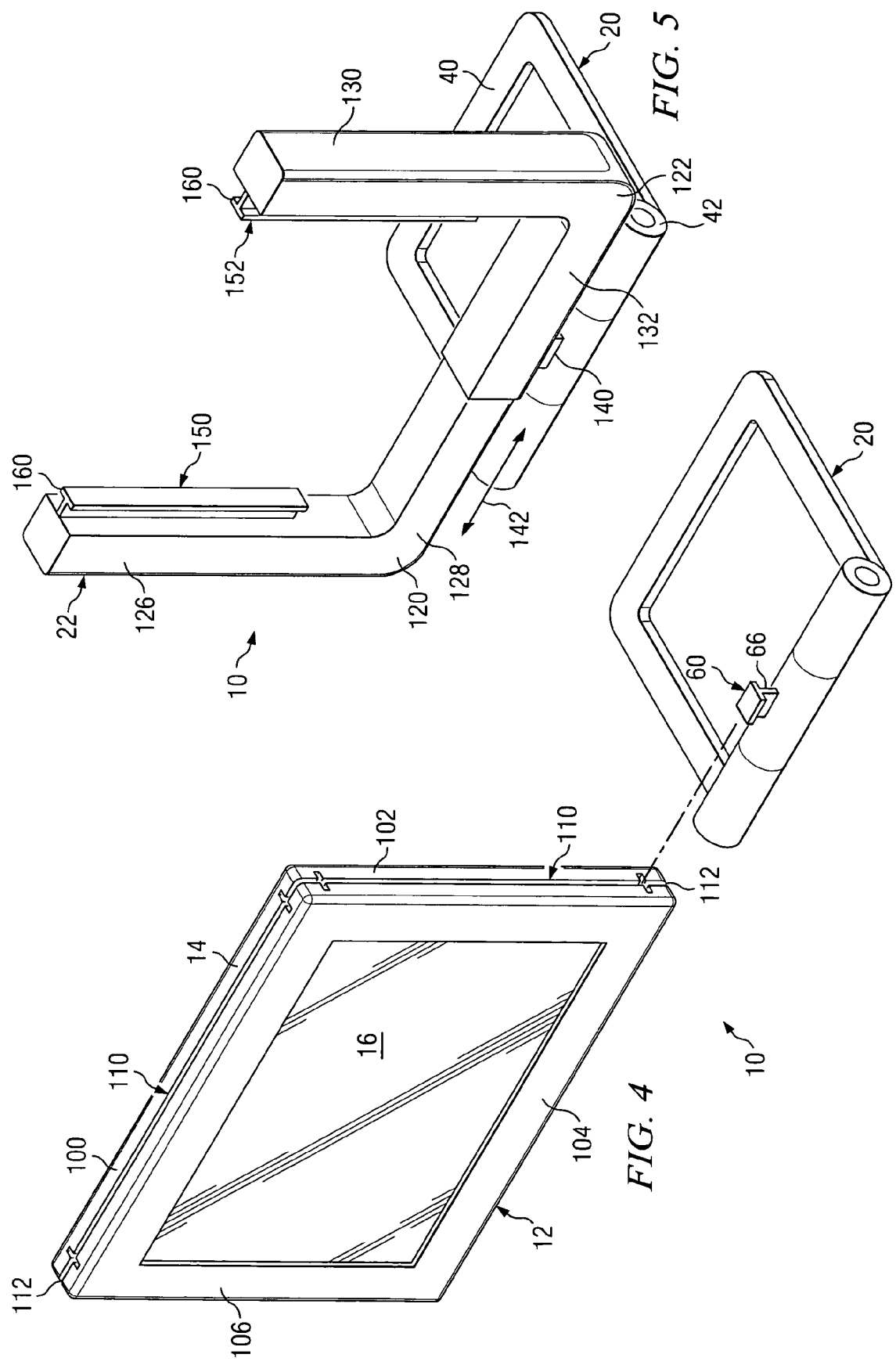

COMPUTER DOCKING SYSTEM

BACKGROUND

A variety of different types of computer devices are configured to connect to a docking station. However, changing a viewing orientation of the computer device after docking is generally difficult, time-consuming and inconvenient. For example, some docking stations require electrical disconnection and re-connection to change viewing orientations of the computer device. Other docking stations require a complex reconfiguring of the mechanical attachment structure to accommodate a different viewing orientation of the computer device.

SUMMARY OF THE INVENTION

In accordance with one embodiment of the present invention, a computer docking system comprises a docking bracket having a plurality of holding members where the holding members are adapted to receive and support a computer display device. Each holding member is also adapted to interchangeably engage the support base to enable positioning of the computer display device in at least two different viewing orientations.

In accordance with another embodiment of the present invention, a computer docking system comprises a docking bracket having a plurality of holding members for receiving and supporting a computer display device. The docking system also comprises a support base adapted to interchangeably engage each of the plurality of holding members such that each engagement with one of the plurality of holding members positions the computer display device in a different viewing orientation.

In accordance with another embodiment of the present invention, a computer docking system comprises a docking bracket having at least one engagement element disposed thereon and a display device having at least two sides thereof adapted to interchangeably engage the at least one engagement element of the docking bracket to enable positioning of the display device in at least two different viewing orientations.

In accordance with another embodiment of the present invention, a computer docking system comprises a support base having an engagement element adapted to cooperate with a display device. The engagement element is adapted to transition from one side of the display device to another side of the display device to accommodate a change in a viewing orientation of the computer display device.

BRIEF DESCRIPTION OF THE DRAWINGS

For a more complete understanding of the present invention and the advantages thereof, reference is now made to the following descriptions taken in connection with the accompanying drawings in which:

FIG. 4 is a diagram illustrating another embodiment of a computer docking system in accordance with the present invention; and FIG. 5 is a diagram illustrating another embodiment of a computer docking system in accordance with the present invention.

DETAILED DESCRIPTION OF THE DRAWINGS

The preferred embodiments of the present invention and the advantages thereof are best understood by referring to FIGS. 1-5 of the drawings, like numerals being used for like and corresponding parts of the various drawings.

Figure 1:
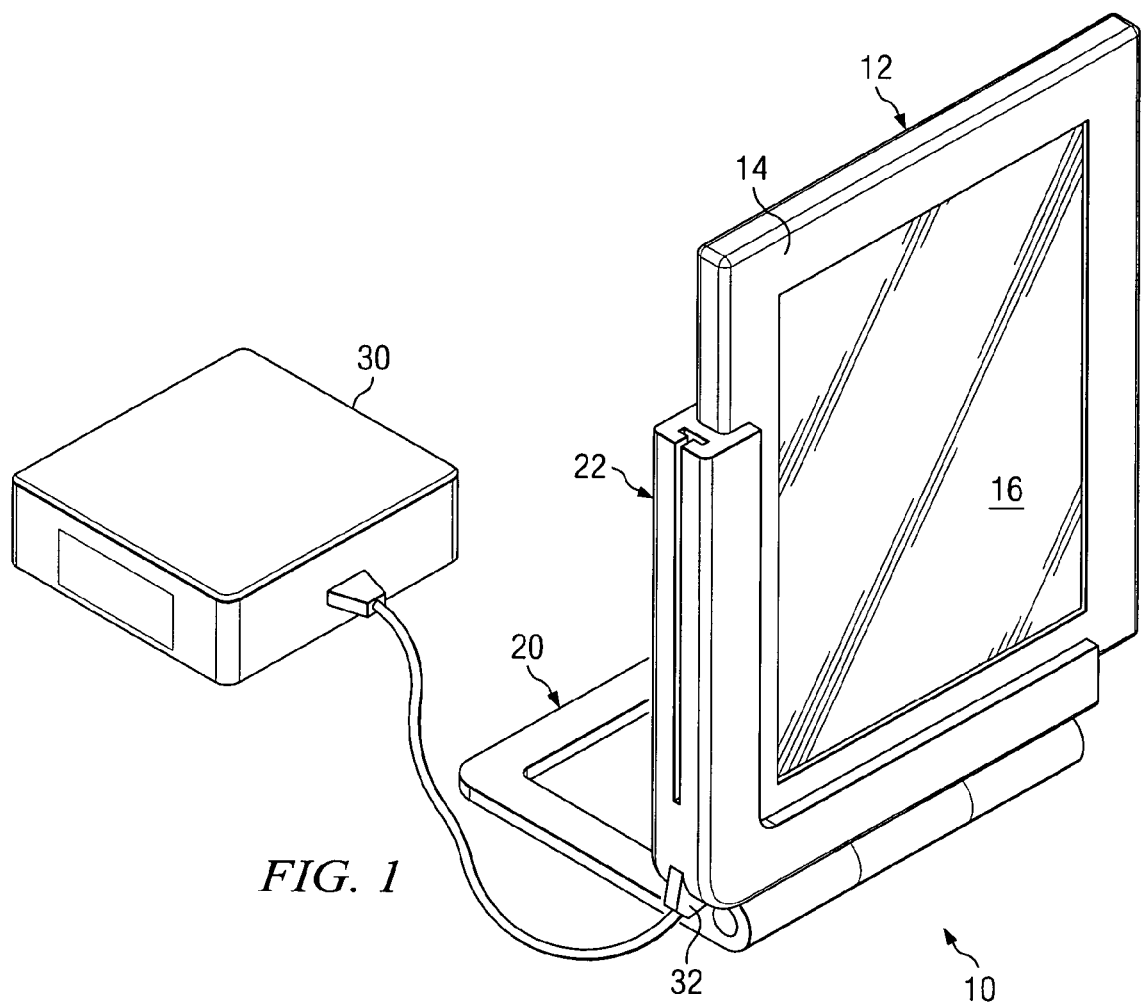
FIG. 1 is a diagram illustrating an embodiment of a computer docking system in accordance with the present invention.

FIG. 1 is a diagram illustrating an embodiment of a computer docking system 10 in accordance with the present invention. Briefly, computer docking system 10 enables a user to conveniently change a viewing orientation of a computer display device 12, for example, from portrait to landscape orientation, or vice versa, without disconnecting computer display device 12 from an electrical connection and without time-consuming or complex mechanical reconfiguring of the docking station.

In the embodiment illustrated in FIG. 1, computer display device 12 comprises a tablet personal computer 14 having a working or display surface 16. However, it should be understood that system 10 may be configured to accommodate other types of computer devices such that a display or working surface of such devices is easily and conveniently positioned in a desired viewing orientation. In the embodiment illustrated in FIG. 1, docking system 10 comprises a support base 20 and a docking bracket 22. In the embodiment illustrated in FIG. 1, docking system 10 is communicatively coupled to a computer resource 30 such as, but not limited to, a compact disc drive, notebook computer base, or other type of electronic resource, to enable data communications between resource 30 and computer display device 12. However, it should be understood that docking system 10 may be used independently of any computer resource 30 connection. In the embodiment illustrated in FIG. 1, computer resource 30 is communicatively coupled to docking system 10 via a connector 32 coupled to docking bracket 22. However, it should be understood that docking system 10 may be otherwise communicatively coupled to resource 30. As will be described further below, docking bracket 22 communicatively coupled to display device 12 to enable data communications between display device 12 and computer resource 30. Additionally, it should be understood that display device 12 may be adapted for wireless communications with computer resource 30 and/or docking bracket 22.

Figure 2:
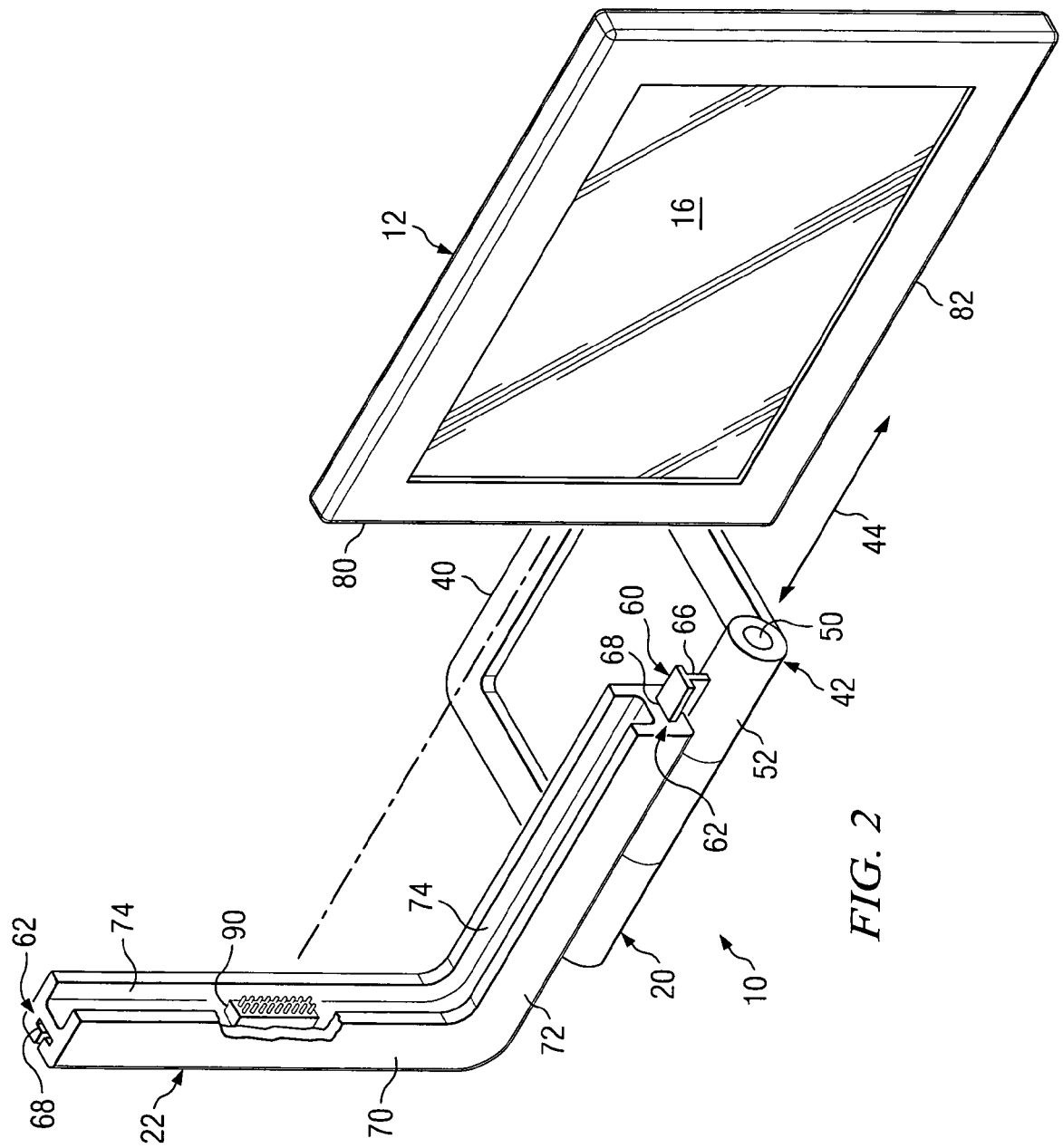
FIG. 2 is a diagram illustrating an exploded view of the computer docking system illustrated in FIG. 1.

FIG. 2 is a diagram illustrating an exploded view of an embodiment of docking system 10 in accordance with the present invention. In the embodiment illustrated in FIG. 2, support base 20 comprises a support member 40 coupled to a hinge assembly 42 to enable rotational movement of support member 40 relative to docking bracket 22 about an axis 44 of hinge assembly 42. In the embodiment illustrated in FIG. 2, hinge assembly 42 comprises an inner cylinder 50 rotatably coupled to an outer cylinder 52. Inner cylinder 50 is fixedly coupled to, or forms an integral part of, support member 40. Outer cylinder is adapted to be releasably coupled to docking bracket 22. Thus, in operation, hinge assembly 42 enables a user to change an angular viewing orientation of display device 12 by rotating support base 20 relative to docking bracket 22 via hinge assembly 42 in the direction indicated by 44. However, it should also be understood that other types of devices or mechanisms may be used to enable a user to change an angular viewing orientation of display device 12.

In the embodiment illustrated in FIG. 2, support base 20 and docking bracket 22 are configured having complementary engagement elements to enable releasable engagement of docking bracket 22 to support base 20. For example, in the embodiment illustrated in FIG. 2, support base 20 comprises an engagement element 60 adapted to cooperate with a corresponding engagement element 62 formed in docking bracket 22. In the embodiment illustrated in FIG. 2, engagement element 60 comprises a T-shaped rail 66 adapted to engage and cooperate with a corresponding T-shaped channel 68 formed in docking bracket 22. However, it should be understood that support base 20 and docking bracket 22 may be otherwise configured to provide releasable engagement of docking bracket 22 with support base 20.

In the embodiment illustrated in FIG. 2, docking bracket 22 comprises contiguously formed holding members 70 and 72 disposed substantially perpendicular relative to each other, thereby forming an L-shaped docking bracket 22. In the embodiment illustrated in FIG. 2, docking bracket 22 is formed as a unitary construction (i.e., holding members 70 and 72 constructed or formed as a single element or unit). However, it should be understood that docking bracket 22 may also be formed from multiple elements (e.g., holding members 70 and 72 formed as separate elements and attached to each other). In operation, docking bracket 22 is configured to support adjacent sides 80 and 82, respectively, of computer display device 12. For example, in the embodiment illustrated in FIG. 2, each holding member 70 and 72 of docking bracket 22 comprises a U-shaped engagement channel 74 to engage and otherwise support adjacent sides 80 and 82, respectively, of computer display device 12. However, it should be understood that holding members 70 and 72 of docking bracket 22 may be otherwise configured to engage and support computer display device 12.

As illustrated in FIG. 2, an outwardly disposed surface of each holding member 70 and 72 is configured having engagement element 62 such that either holding member 70 or 72 may be releasably engaged with support base 20. For example, in the embodiment illustrated in FIG. 2, either holding member 70 or holding member 72 may be releasably engaged with support base 20 by slideably engaging rail 66 with channel 68 formed in either holding member 70 or 72.

Docking bracket 22 is also configured to communicatively engage display device 12 and provide a communication interface between display device 12 and computer resource 30. For example, in the embodiment illustrated in FIG. 2, an electrical connector 90 is disposed within channel 74 of holding member 70 to communicatively engage a corresponding connector disposed along side 80 of display device 12. Alternatively, or additionally, connector 90 may be disposed on holding member 72. Docking bracket 22 is internally configured to provide a data communications path between connector 90 and connector 32 to provide a communications link between display device 12 and computer resource 30. Further, it should be understood that docking bracket 22 may be otherwise configured to cooperate with display device 12 and provide a data communication link to display device 12.

Thus, in operation, computer display device 12 is inserted into docking bracket 22 and communicatively engages docking bracket 22 via connector 90. For example, in the embodiment illustrated in FIG. 2, display device 12 is slideably inserted into channel 74 of holding member 72 and into engagement with connector 90 located on holding member 70. However, it should also be understood that, if connector 90 is located on holding member 72, display device 12 may be slideably inserted into channel 74 of holding member 70 and into engagement with connector 90. Further, it should be understood that connector 90 and a corresponding electrical connector of display device 12 may be selected or configured to accommodate slideable insertion of display device into either holding member 70 or 72, sequentially or simultaneously (e.g., a pin/pad type of connector, optical connector, or other type of connector). Docking bracket 22 is releasably coupled to support base 20 by engaging element 60 of support base 20 with engagement element 62 of either holding member 70 or 72. For example, in operation, either holding member 70 or 72 is releasably coupled to support base 20 by slideably engaging rail 66 with channel 68 formed in respective holding member 70 or 72. In FIG. 2, holding member 72 is illustrated in engagement with support base 20, and display device 12 is illustrated in a landscape viewing orientation. A user may change the angular viewing orientation of display device 12 by rotating support base 20 relative to docking bracket 22 via hinge assembly 42. A viewing orientation of display device 12 may be further modified by interchangeably engaging holding members 70 and 72 with support base 20. For example, to change a viewing orientation of computer display device 12 from landscape, as illustrated in FIG. 2, to a portrait orientation, holding member 72 is disengaged from support base 20 by slideably disengaging channel 68 of holding member 72 from rail 66 and slideably engaging channel 68 of holding member 70 with rail 66.

FIGS. 3A-3D are diagrams illustrating another embodiment of docking system 10 in accordance with the present invention. In the embodiment illustrated in FIGS. 3A-3D, engagement element 60 of base 20 is formed from a semi-rigid material to enable flexible movement of at least a portion of engagement element 60 to accommodate a change in a viewing orientation of display device 12 while docking bracket 22 remains in engagement with engagement member 60 of base 20. For example, as illustrated in FIGS. 3A-3D, engagement element 62 of docking bracket 22 extends from holding member 70 around a corner 96 of docking bracket 22 to holding member 72. Thus, in the embodiment illustrated in FIGS. 3A-3D, channel 68 extends around corner 96 of docking bracket 22 from holding member 70 to holding member 72.

Figure 3A:
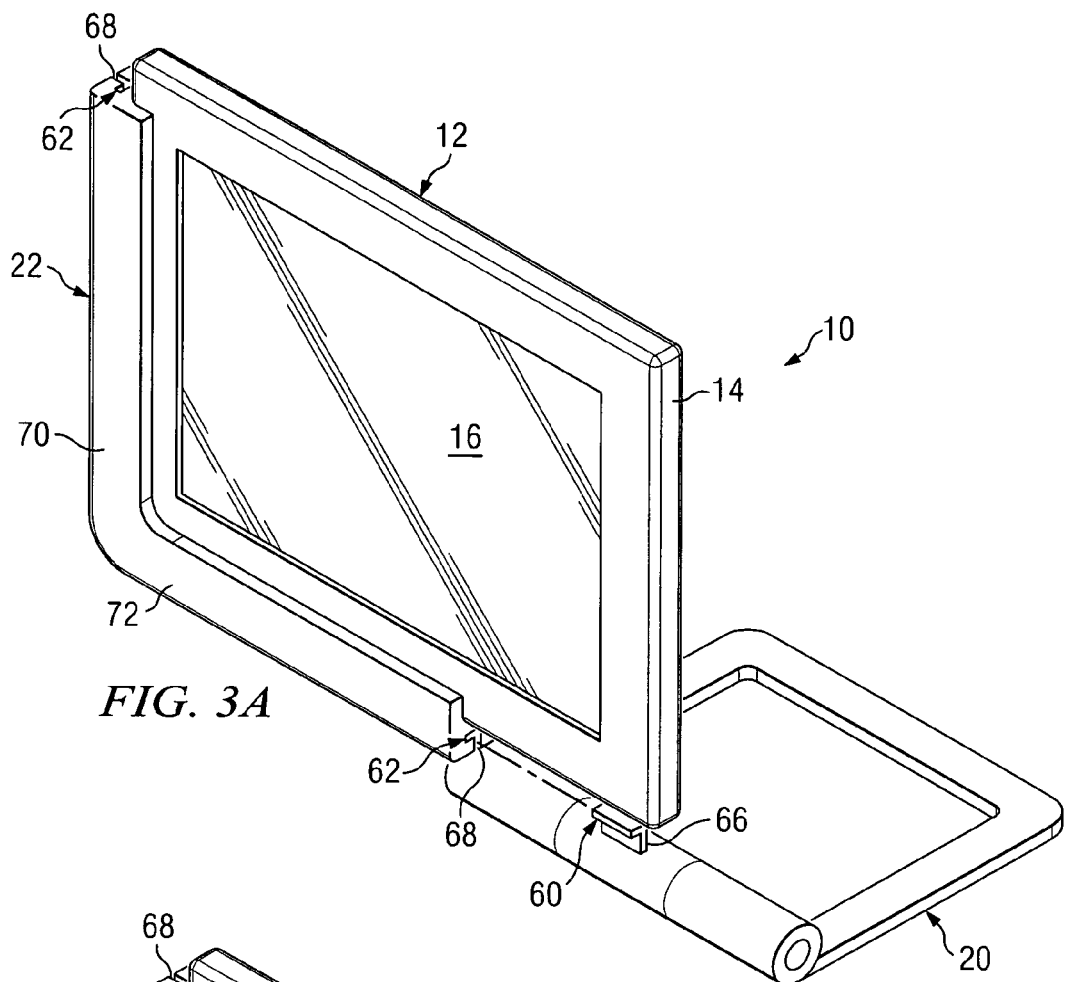
FIGS. 3A-3D are diagrams illustrating another embodiment of a computer docking system in accordance with the present invention.
Figure 3B:
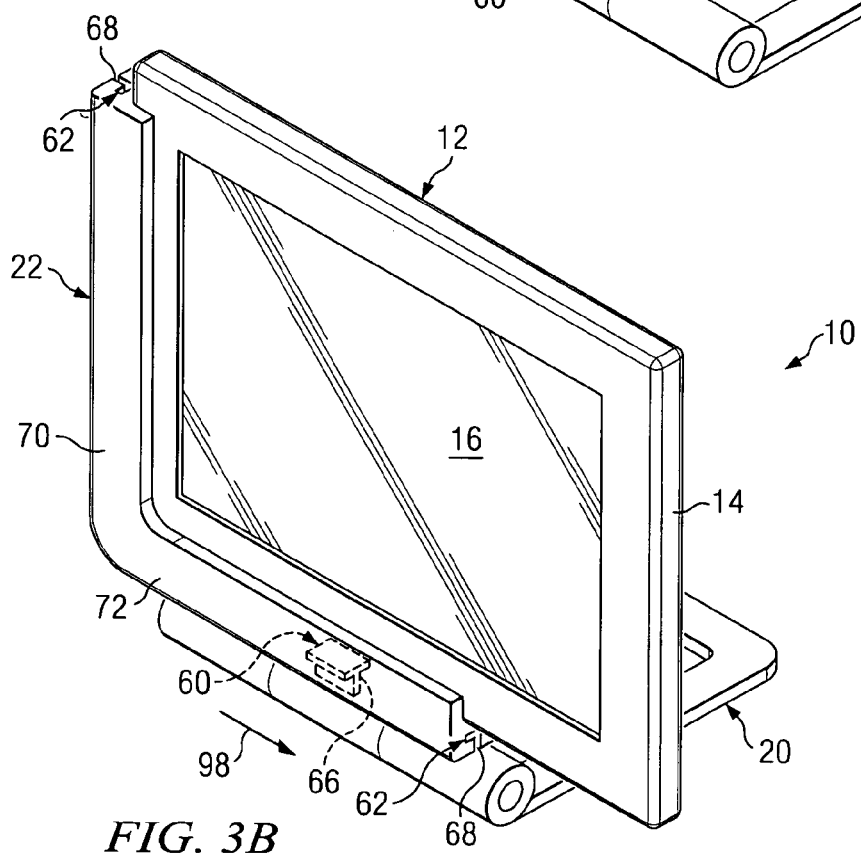
Figure 3C:
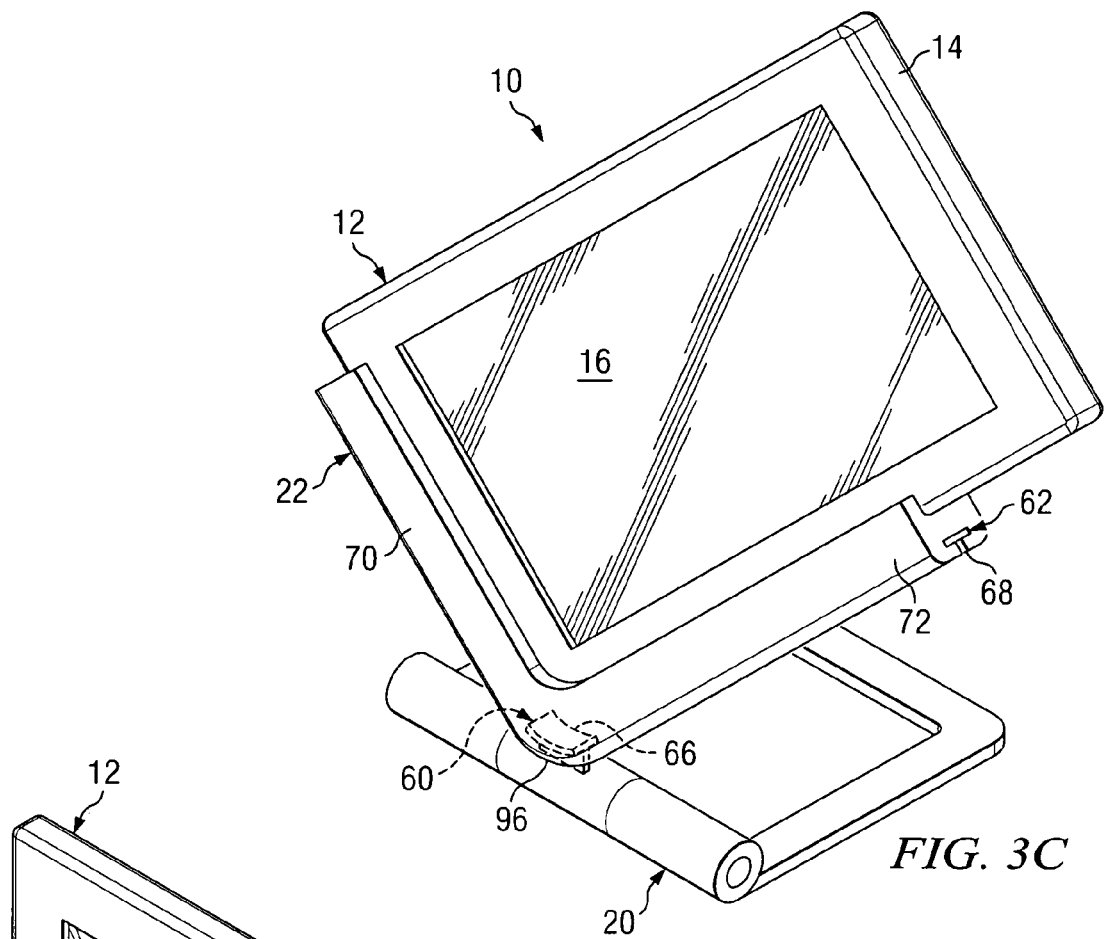
Figure 3D:
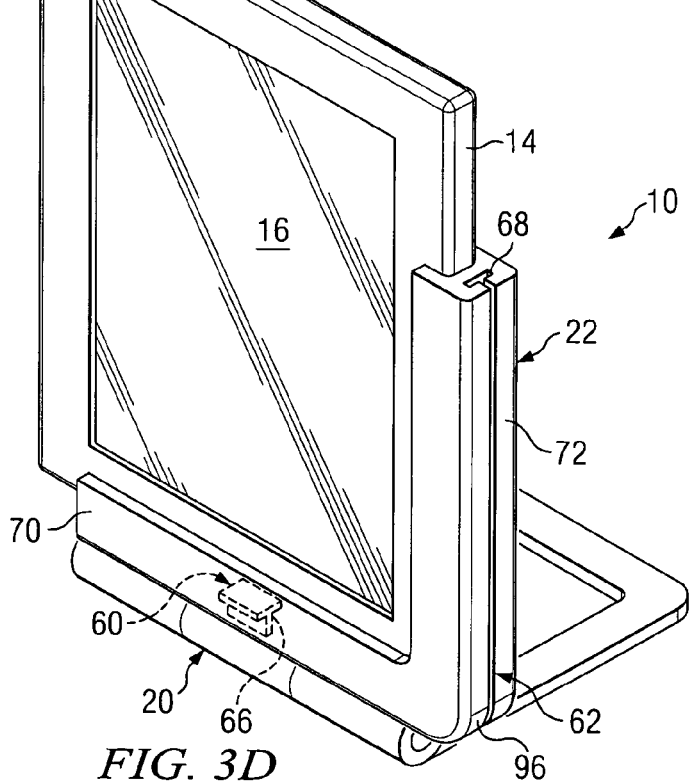

Thus, in operation, to change a viewing orientation of display device 12, docking bracket 22 is translated in the direction indicated at 98 in FIG. 3B relative to engagement member 60 and rotated through corner 96 of docking bracket 22, as illustrated in FIG. 3C, to a position illustrated in FIG. 3D. As illustrated in FIG. 3C, engagement member 60 is configured having a length and flexibility to accommodate transition of engagement element 60 through corner 96 of docking bracket 22. Therefore, in the embodiment illustrated in FIGS. 3A-3D, a viewing orientation of display device 12 may be modified without disengaging display device 12 from either docking bracket 22 or base 20.

FIG. 4 is a diagram illustrating another embodiment of docking system 10 in accordance with the present invention. In the embodiment illustrated in FIG. 4, display device 12 is configured to engage and cooperate with engagement element 60 of base 20 to accommodate a change in viewing orientation of display device 12. For example, in the embodiment illustrated in FIG. 4, sides 100, 102, 104 and 106 of display device 12 are adapted to engage and cooperate with engagement element 60 of base 20. In the embodiment illustrated in FIG. 4, four sides 100, 102, 106 and 108 are adapted to cooperate with engagement element 60 to enable greater flexibility for engagement of display device 12 with base 20. However, it should be understood that the quantity of sides of display device 12 that are adapted to cooperate with engagement element 60 may be otherwise varied.

Thus, as illustrated in FIG. 4, sides 100, 102, 104 and 106 are formed having a complementary engagement element 110 relative to engagement element 60 to enable engagement of any of sides 100, 102, 104 or 106 with engagement element 60. For example, in the embodiment illustrated in FIG. 4, engagement element 110 comprises an integrally formed T-shaped channel 112 adapted to cooperate with T-shaped rail 66 of base 20. However, it should be understood that engagement elements 60 and 110 may be otherwise configured to enable cooperative engagement of display device 12 with base 20. Thus, in operation, a viewing orientation of display device 12 may be modified by engaging a desired side 100, 102, 104, or 106 with engagement element 60 of base 20.

In the embodiment illustrated in FIG. 5, engagement element 110 also extends around corners of display device 12 to enable viewing orientation changes of display device 12 without disengagement of display device 12 from engagement element 66. For example, similar to the embodiment illustrated in FIGS. 3A-3D, engagement element 66 illustrated in FIG. 5 is configured having a size and flexibility to enable transition of engagement element 66 to different sides 100, 102, 104 and 106 of display device 12 without disengaging element 66 from display device 12. Thus, in operation, to change a viewing orientation of display device 12 without disengaging display device 12 from support base 20, display device may be translated in a desired direction toward a corner of display device and rotated such that engagement element 66 transitions to a different side 100, 102, 104 or 106 of display device 12, thereby changing the viewing orientation of display device 12.

FIG. 5 is a diagram illustrating another embodiment of docking system 10 in accordance with the present invention. In the embodiment illustrated in FIG. 5, docking bracket 22 comprises a U-shaped configuration formed by holding members 120 and 122. In the embodiment illustrated in FIG. 5, holding member 120 comprises a vertical leg member 126 and a horizontal leg member 128, and holding member 122 comprises a vertical leg member 130 and a horizontal leg member 132. In the embodiment illustrated in FIG. 5, holding member 122 is fixedly coupled to base 20. For example, in the embodiment illustrated in FIG. 5, leg member 132 is fixedly coupled to a portion of hinge assembly 42 via coupling element 140 to accommodate rotatable movement of holding member 122 relative to support member 40 via hinge assembly 42.

In the embodiment illustrated in FIG. 5, holding member 120 is adapted to slidably engage holding member 122 to enable adjustable movement of holding member 120 relative to holding member 122 in the direction indicated at 142. For example, in the embodiment illustrated in FIG. 5, leg member 128 is adapted to be disposed within leg member 132 of holding member 122 to enable translational movement of holding member 120 relative to holding member 122 in direction 142. However, it should be understood that holding members 120 and 122 may be otherwise configured to enable movement of holding member 120 relative to holding member 122 in the direction 142.

In the embodiment illustrated in FIG. 5, leg members 126 and 130 of respective holding members 120 and 122 are configured having respective engagement elements 150 and 152 adapted to engage and cooperate with corresponding engagement members formed on display device 12. For example, in the embodiment illustrated in FIG. 5, engagement elements 150 and 152 each comprise a T-shaped rail 160 for engaging a corresponding complementary T-shaped channel formed on display device 12, such as engagement element 110 of display device 12 formed as channel 112 illustrated in FIG. 4. However, it should be understood that engagement elements 150 and 152 may be otherwise configured to engage and cooperate with corresponding engagement elements formed on display device 12. Additionally, in the embodiment of FIG. 5, both holding members 120 and 122 are configured having an engagement element; however, it should be understood that docking bracket 22 may also be configured having single holding member 120 or 122 configured with an engagement member for cooperating with and engaging a corresponding engagement element of display device 12.

Thus, in the embodiment illustrated in FIG. 5, a viewing orientation of display device 12 may be changed by locating display device 12 in a desired orientation and translating holding member 120 relative to holding member 122 to accommodate the desired orientation of display device 12 by accommodating a width of display device 12 in the desired orientation. Docking bracket 22 is adapted to accommodate a variety of sizes (i.e., length and/or width) of display device 12, thereby accommodating different viewing orientations of display device 12 and/or different sizes of display device 12. Thus, in the embodiment illustrated in FIG. 5, a display orientation of display device 12 may be changed, for example, from portrait mode to landscape mode, or vice versa, by disengaging display device 12 from docking bracket 22, changing a location of holding member 120 relative to holding member 122 by translating holding member 120 relative to holding member 122 to correspond to the width of display device 12 in the desired orientation, and re-engaging display device 12 with docking bracket 22 using engagement elements 150 and 152. For example, referring to FIGS. 4 and 5, engagement elements 110 of display device 12 may be engaged with engagement elements 150 and 152 of docking bracket 122. In the embodiment of FIG. 5, a single holding member of bracket 22 is illustrated as being adjustable (i.e., holding member 120); however, it should be understood that docking bracket 22 may also be configured such that both holding members 120 and 122 are adjustable to accommodate different viewing orientations and/or sizes of display device 12.

Thus, some embodiments of the present invention enable a user to change a viewing orientation of display device 12 without electrically disconnecting display device 12 (e.g., from connector 90) by changing the attachment orientation of docking bracket 22 relative to support base 20. For example, to change a viewing orientation of computer display device 12 from portrait to landscape mode, or visa versa, a respective holding member 70 or 72 may be slid into engagement with support base 20 via engagement members 60 and 62. Thus, some embodiments of the present invention are configured comprising a docking bracket 22 having interchangeable holding members 70 and 72 such that either holding member 70 or 72 may be releasably engaged with support base 20 corresponding to a desired viewing orientation of display device 12. In other embodiments of the present invention, display device 12 is configured to interchangeably engage support base 20 to accommodate a variety of viewing orientations of display device 12. For example, in some embodiments of the present invention, multiple sides of display device 12 are configured to engage and cooperate with support base 20 to enable a change to viewing orientations of display device 12 relative to support base 20. In other embodiments of the present invention, support base 20 is adapted to accommodate a variety of viewing orientations of display device 12 and/or a variety of sizes of display device 12.

What is claimed is:

1. A computer docking system, comprising:
   a support base; and
   a docking bracket connected to the support base and having a plurality of holding members that receive and support a computer display device, each holding member interchangeably engages the support base, the plurality of holding members alternately engageable with the support base to transition the computer display device between a portrait viewing orientation and a landscape viewing orientation, wherein the docking bracket is adapted to enable a change in the viewing orientation of the display device without disengagement of the docking bracket from the support base.

2. The system of claim 1, wherein the plurality of holding members are disposed substantially perpendicular relative to each other.

3. The system of claim 1, wherein at least one of the holding members slideably engages the support base.

4. The system of claim 1, wherein the docking bracket is rotatably coupled to the support base.

5. The system of claim 1, wherein at least one of the holding members comprises a U-shaped channel that supports a side of the computer display device.

6. The system of claim 1, wherein the support base comprises a hinge assembly.

7. The system of claim 1, wherein the holding members support adjacent sides of the computer display device.

8. The system of claim 1, wherein the holding members are formed as a single unit.

9. The system of claim 1, the docking bracket having an engagement element extending from one of the plurality of the holding members to another one of the plurality of holding members.

10. The system of claim 1, the docking bracket adapted to enable a transition of an engagement element of the support base from one of the plurality of the holding members to another one of the plurality of holding members without disengagement of the docking bracket from the support base.

11. A computer docking system, comprising:
a support base; and
a docking bracket connected to the support base and having a plurality of holding members that receive and support a computer display device, each holding member interchangeably engages the support base, the plurality of holding members alternately engageable with the support base to transition the computer display device between a portrait viewing orientation and a landscape viewing orientation without disengaging the docking bracket from the support base by translating the plurality of holding members along the support base, wherein the plurality of holding members form an L-shaped docking bracket.

12. A computer docking system, comprising:
a first bracket that supports a first portion of a computer display device when the computer display device is in a portrait orientation;
a second bracket that supports a second portion of the computer display device when the computer display device is in a landscape orientation; and
a support base connected to the first and second brackets that interchangeably engage with the support base to transition the computer display device between the portrait orientation and the landscape orientation, wherein the first and second brackets slideably engage an engagement element on a hinge of the support base, wherein the first and second brackets are formed as a single unit.

13. The system of claim 12, wherein the first and second brackets support adjacent sides of the computer display device.

14. The system of claim 12, wherein the first and second brackets are substantially perpendicular relative to each other.

15. A computer docking system, comprising:
a docking bracket having a plurality of holding members for receiving and supporting a computer display device; and
a support base adapted to interchangeably engage each of the plurality of holding members, each engagement with one of the plurality of holding members positioning the computer display device in either a portrait viewing orientation or a landscape viewing orientation, wherein the docking bracket is adapted to enable a transition between different viewing orientations of the computer display device without disengagement of the docking bracket from the support base, wherein the support base is adapted to slideably engage each of the plurality of holding members.

16. The system of claim 15, wherein the docking bracket is rotatably coupled to the support base.

17. The system of claim 15, wherein the support base comprises a hinge assembly.

18. The system of claim 15, an engagement element of the support base adapted to transition from one of the plurality of the holding members to another one of the plurality of holding members without disengagement of the support base from the docking bracket.

19. A computer docking system, comprising:
a docking bracket having a plurality of holding members for receiving and supporting a computer display device; and
a support base adapted to interchangeably engage each of the plurality of holding members, each engagement with one of the plurality of holding members positioning the computer display device in either a portrait viewing orientation or a landscape viewing orientation, wherein the docking bracket comprises an L-shaped docking bracket, and the computer display device transitions between the portrait and landscape viewing orientations without disengaging the computer display device from the support base.

* * * * *